United States Patent [19]

Ichikawa et al.

[11] Patent Number: 5,204,524
[45] Date of Patent: Apr. 20, 1993

[54] TWO-DIMENSIONAL OPTICAL ENCODER WITH THREE GRATINGS IN EACH DIMENSION

[75] Inventors: Souji Ichikawa; Mikio Suzuki; Wataru Ishibashi; Shingo Kuroki, all of Kanagawa, Japan

[73] Assignee: Mitutoyo Corporation, Tokyo, Japan

[21] Appl. No.: 848,116

[22] Filed: Mar. 9, 1992

[30] Foreign Application Priority Data

Mar. 22, 1991 [JP] Japan .............................. 3-25416[U]
May 13, 1991 [JP] Japan .............................. 3-43266[U]
Oct. 14, 1991 [JP] Japan .............................. 3-92225[U]

[51] Int. Cl.⁵ .............................................. H01J 3/14
[52] U.S. Cl. ............................ 250/237 G; 250/231.16
[58] Field of Search ...................... 250/231.14, 231.16, 250/237 G; 356/374, 375

[56] References Cited

U.S. PATENT DOCUMENTS

| 3,957,378 | 5/1976 | Zipin .............................. 250/237 G |
| 4,074,131 | 2/1978 | Schwebel ....................... 250/237 G |
| 4,772,835 | 9/1988 | Weaver et al. . |
| 5,026,164 | 6/1991 | Ichikawa . |

FOREIGN PATENT DOCUMENTS 1-272917 10/1989 Japan .
1513898 6/1978 United Kingdom .
2034880 6/1980 United Kingdom .

OTHER PUBLICATIONS

John T. Winthrop et al.; Theory of Fresnel Images. I. Plane Periodic Objects in Monochromatic Light; Journal of the Optical Society of America; vol. 55, No. 4, Apr. 1965, pp. 373-381.

Primary Examiner—David C. Nelms
Attorney, Agent, or Firm—Oliff & Berridge

[57] ABSTRACT

A first grating is formed on a main scale, and a second and third gratings on an index scale. The first grating generally assumes a cruciform shape, and consists of a grating having grating lines arranged in the X-direction and another grating having grating lines arranged in the Y-direction. The second grating is formed in a square central area of the index scale, and consists of two gratings having grating lines arranged in the X-direction and divided at the center and another two gratings having grating lines arranged in the Y-direction and divided at the center. The third grating consists of four gratings having grating lines arranged in the X-direction with different phases and another four gratings having grating lines arranged in the Y-direction with different phases. A light-emitting element and eight photodetectors that are arranged corresponding to the respective gratings of the third grating are fixed to a movable member on which the index scale is attached. Light emitted from the light-emitting element passes though the second grating, reflected by the first grating, passes through the third grating, and finally detected by the photodetectors. Alternatively, the first grating may consist of rectangular portions arranged in the X- and Y-direction in a matrix form.

11 Claims, 4 Drawing Sheets

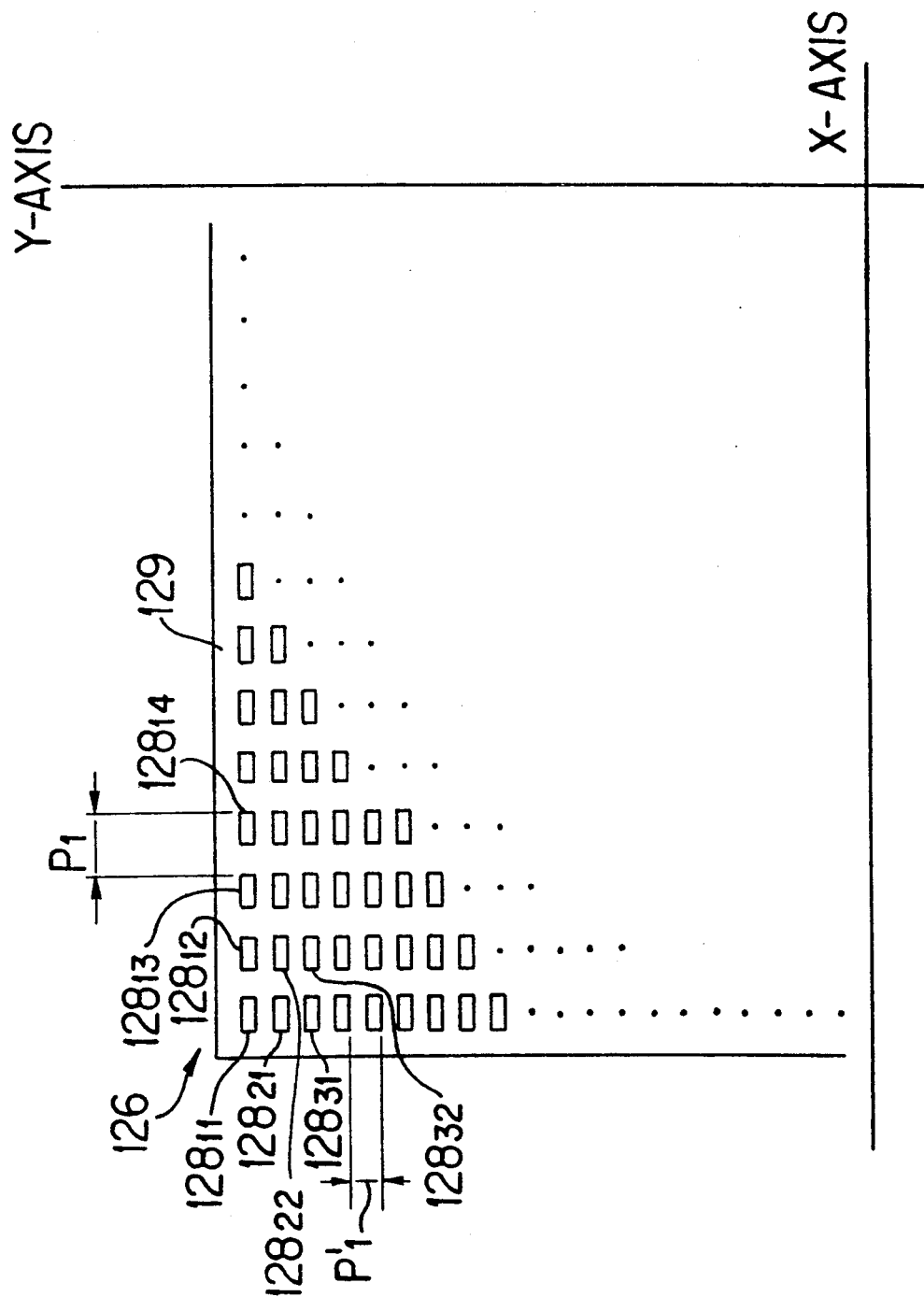

TWO-DIMENSIONAL OPTICAL ENCODER WITH THREE GRATINGS IN EACH DIMENSION

BACKGROUND OF THE INVENTION

The present invention relates to optical encoders and, more specifically, to an optical encoder capable of detecting two-dimensional displacement.

Various types of encoders are presently used in measuring instruments and machine tools and, particularly in recent years, in information equipment, to detect relative displacement between two members. In particular, optical encoders are commonly used in places where non-contact-type displacement detection is required.

The optical encoders have a structure in which a main scale and an index scale each having a grating are provided on respective members which make relative movement. For instance, the main scale is irradiated with light passed through the grating of the index scale, and the light reflected or transmitted from the grating of the main scale is detected by a photodetector. A relative displacement between the two members are determined based on a phase variation and other parameters of the detection signal.

A three-grating-type, one-dimensional optical encoder is disclosed in U.S. Pat. No. 5,026,164.

However, conventional general optical encoders are only capable of one-dimensional measurement of linear or rotational displacement. That is, a single encoder cannot detect two-dimensional displacement between two members.

SUMMARY OF THE INVENTION

The present invention has been made to solve the above problem in the art, and has an object of providing an optical encoder which has a simple structure, is easy to manufacture, and is capable of two-dimensional detection of very small displacements and large-span displacements.

According to the invention, in a two-dimensional optical encoder comprising a first member and a second member having a main scale and an index scale which are opposed to each other, and detecting a relative displacement between the first member and the second member in directions of an X-axis and a Y-axis, said optical encoder comprises:

a first grating formed on the main scale and including two sub-gratings having grating lines arranged in the directions of the X- and Y-axis, respectively;

a second grating formed on a central area of the index scale, and including a sub-grating extending along the X-axis and having grating lines arranged in the direction of the X-axis, and a sub-grating extending along the Y-axis and having grating lines arranged in the direction of the Y-axis;

a third grating formed on the index scale, and having two sub-gratings formed outside the corresponding sub-grating of the second grating and having grating lines arranged in the direction of the X-axis with a phase difference between the two sub-gratings, and two sub-gratings formed outside the corresponding sub-grating of the second grating and having grating lines arranged in the direction of the Y-axis with a phase difference between the two sub-gratings;

a light source fixed to the second member;

a plurality of photodetectors fixed to the second member and arranged corresponding to the respective sub-gratings of the third grating, for receiving light emitted from the light source, transmitted through the second grating, reflected by the first grating, and transmitted through the third grating; and a computing circuit for producing signals indicating relative displacements in the directions of the X- and Y-axis by processing output signals of the plurality of photodetectors.

With the above construction, a three-grating-type displacement detector is formed in each of the X- and Y-direction, whereby the single optical encoder can detect a relative displacement between the main scale and the index scale in both the X- and Y-direction.

BRIEF DESCRIPTION OF THE DRAWINGS

FIG. 7 is a plan view showing a first grating formed on a main scale in an optical encoder according to a second embodiment.

DESCRIPTION OF THE PREFERRED EMBODIMENTS

Preferred embodiments of the present invention are described hereinafter with reference to the accompanying drawings.

Figure 1:
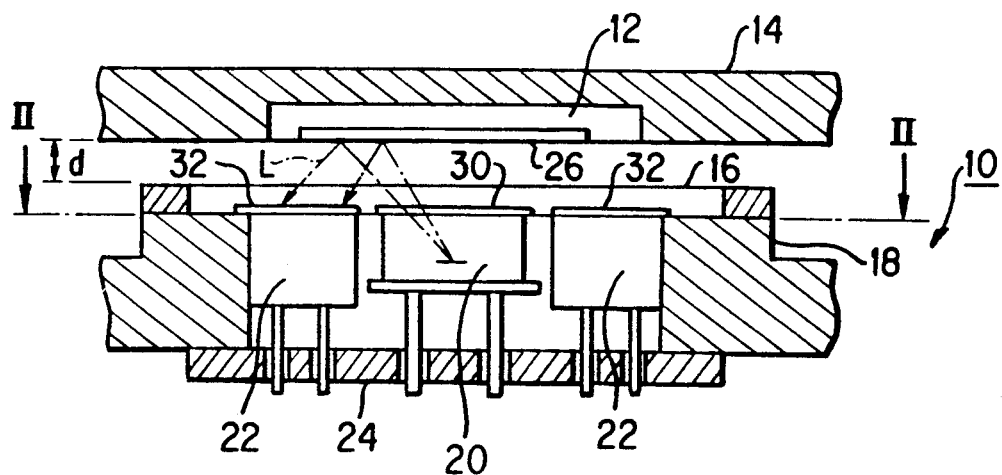
FIG. 1 is a sectional view showing a general configuration of an optical encoder according to a first embodiment of the present invention.
Figure 2:
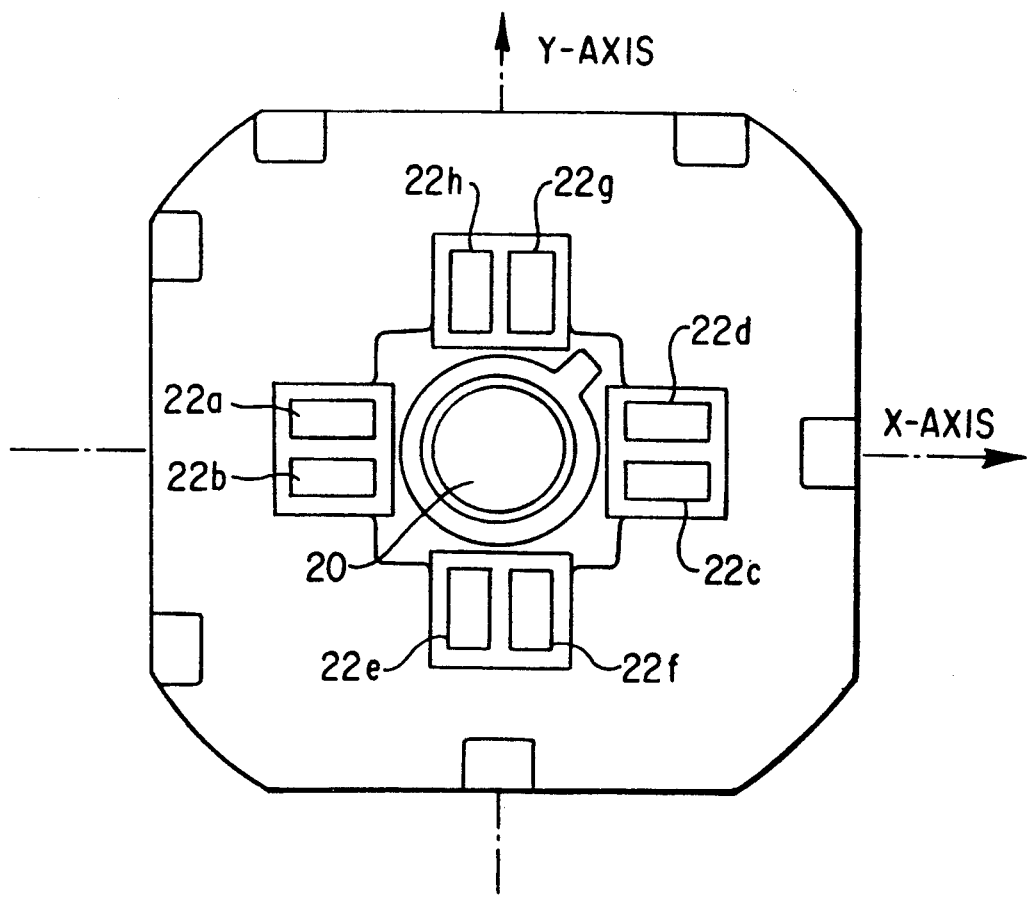
FIG. 2 is a plan view showing the arrangement of a light-emitting element and photodetectors in the first embodiment.

FIG. 1 is a vertical cross sectional view showing a basic configuration of an optical encoder according to a first embodiment of the invention. FIG. 2 is a sectional view taken along line II—II in FIG. 1.

As shown in these figures, in an optical encoder 10, a main scale 12 and an index scale 16 are provided on movable members 14 and 18, respectively, to detect a relative displacement between the members 14 and 18.

In the movable member 18, one light-emitting element 20 and eight photodetectors 22a–22h are attached to the bottom surface of the index scale 16 (FIG. 1). Leads from the light-emitting element 20 and photodetectors 22a–22h are connected to a printed circuit board 24.

Figure 3:
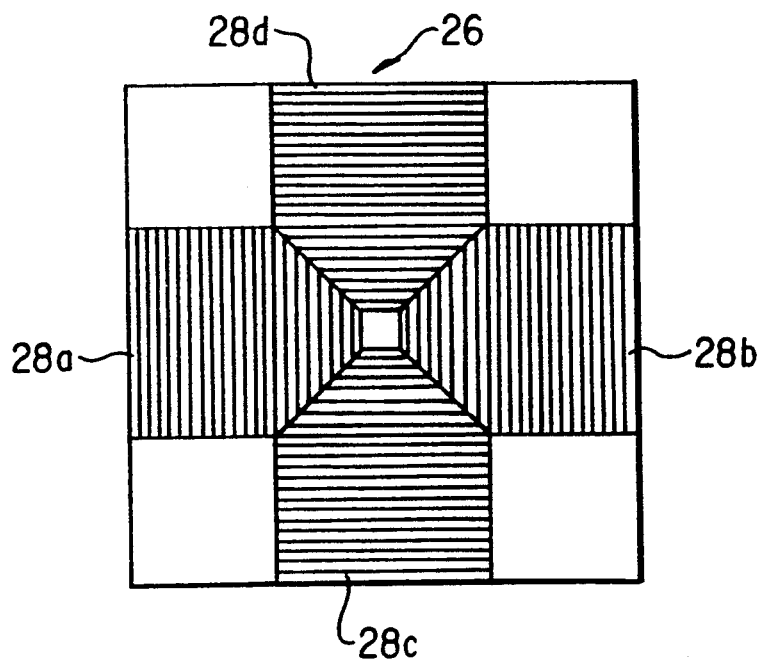
FIG. 3 is a plan view showing a first grating formed on a main scale in the first embodiment.

In the movable member 14, a first grating 26 is formed on the main scale 12. As shown in FIG. 3, the first grating 26 assumes a cruciform shape consisting of four pentagonal reflection gratings (or sub-gratings) 28a–28d. Lines of the gratings 28a and 28b are arranged in the Y-direction, and lines of the gratings 28c and 28c in the X-direction.

Figure 4:
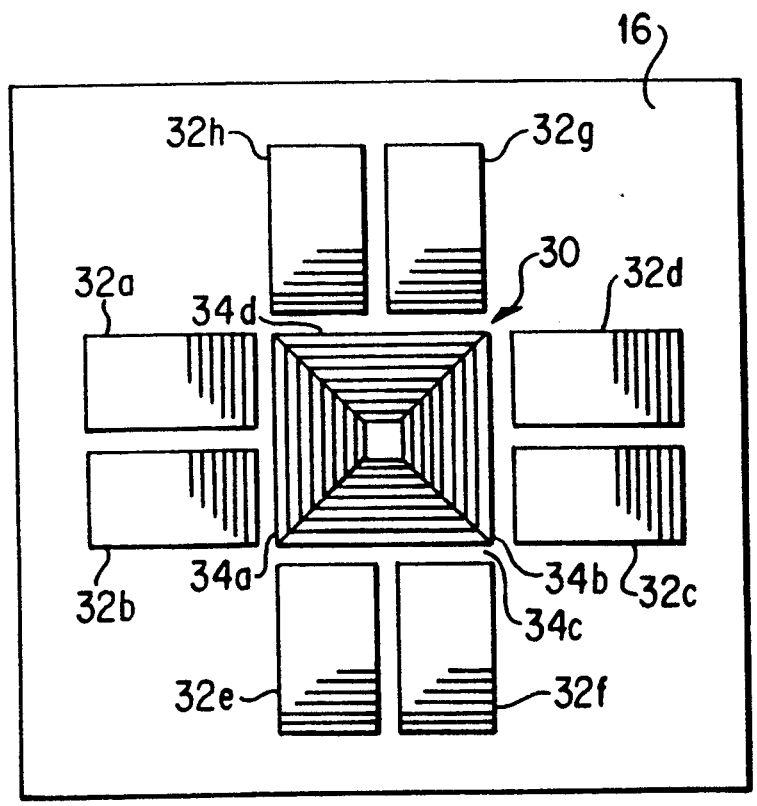
FIG. 4 is a plan view showing a second and a third grating formed on an index scale in the first embodiment.

On the other hand, as shown in FIG. 4, the index scale 16 includes a second grating 30 and a third grating 32. The second grating 30 is a square transmission grating having four triangular transmission gratings (or sub-gratings) 34a–34d which are located opposite the above-mentioned light-emitting element 20. Gratings (or sub-gratings) 32a–32h of the third grating 32 are also transmission gratings arranged opposite the eight respective photodetectors 22a–22h. With this configuration, light L emitted from the light-emitting element 20 is passed through the second grating 30, reflected by the first grating 26, passed through the third grating 32, and finally detected by the photodetectors 22a–22h.

As is understood from the above description, in the optical encoder of the first embodiment, the gratings 34a and 34b of the second grating 30, the gratings 28a and 28b of the first grating 26, and the gratings 32a–32d of the third grating 32 constitute a three-grating-type displacement detector for relative movement in the X-direction. Similarly, the grating 34c and 34d of the second grating 30, the gratings 28c and 28d of the first grating 26, and the gratings 32e–32h of the third grating 32 constitutes another three-grating-type displacement detector for relative movement in the Y-direction.

The three-grating-type displacement detector detects a displacement based on a variation of overlapping relationship among the three gratings. The details thereof are described in Journal of the Optical Society of America, 1965, Vol. 55, No. 4, pp. 373-381.

Figure 5:
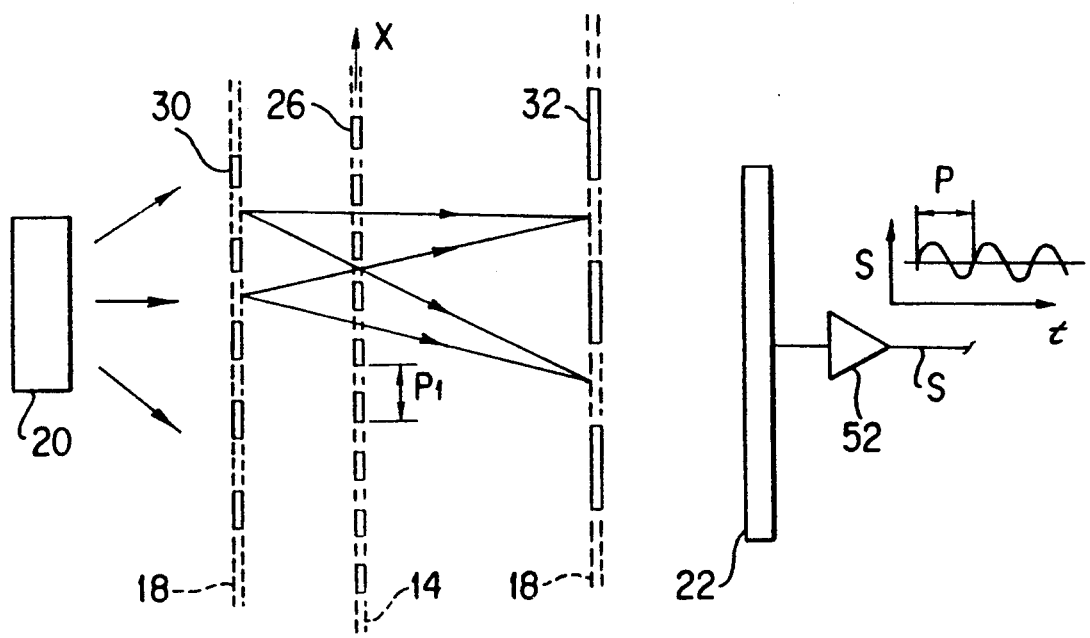
FIG. 5 shows a basic principle of relative movement detection of the invention.

In the case of the first embodiment, as shown in one-dimensional and transmission-scheme representation of FIG. 5, each three-grating-type displacement detector includes the second grating 30 (actually, one of its gratings 34a–34d) and third grating 32 that are arranged in parallel, the first grating 26 which is disposed between and in parallel with the gratings 30 and 32 so as to be movable relative to those gratings, the light-emitting element (e.g., an LED) 20, which is regarded as an area light source, disposed on the left side of the second grating 30 in FIG. 5, and the photodetector 22 disposed on the right side of the third grating 32 in the drawing.

The light emitted from the light-emitting element 20 passes through the second grating 30, first grating 26 and third grating 32 (or is actually reflected by the first grating 26), and reaches the photodetector 22. Therefore, the photodetector 22 photoelectrically converts the light which has been subjected to intensity limitation by the gratings 30, 26 and 32, and a preamplifier 52 amplifies the output of the photodetector 22 to produce a detection signal S.

When the first grating 26 moves at a constant speed, for instance, in the X-direction with respect to the second and third gratings 30 and 32, the light received by the photodetector 22 varies in accordance with a variation of the light intensity reduction due to the shielding by the gratings 30, 26 and 32, so that the detection signal S takes a generally sinusoidal form.

A period P of the detection signal S corresponds to a pitch $P_1$ of the first grating 26. A movement distance of the first grating 26 is determined by a computing circuit (not shown) based on the period P of the detection signal S and its divisional values.

Since, as described above, the first grating 26 is mounted on the movable member 14 and the second and third gratings 30 and 32 on the movable member 18, the relative displacement between the members 14 and 18 can be detected, in a two-dimensional manner as described below.

In the first embodiment, lines of the gratings 28a and 28b of the first grating 26 are formed in parallel with the Y- axis with a pitch of $P_1$, and lines of the gratings 28c and 28d are formed in parallel with the X-axis with a pitch of $P_1'$. Further, lines of the gratings 34a and 34b of the second grating 30 are arranged in parallel with the Y-axis with a pitch of $P_2$, and lines of the gratings 34c and 34d are arranged in parallel with the X-axis with a pitch of $P_2'$.

The gratings 32a–32d of the third grating 32 act as gratings for an Ax phase, Ax' phase, Bx phase and Bx' phase, respectively, and lines of these gratings 32a–32d are formed in parallel with the Y-axis with a pitch of $P_3$. Similarly, the gratings 32e–32h of the third grating 32 act as gratings for an Ay phase, Ay' phase, By phase and By' phase, respectively, and lines of these gratings 32e–32h are arranged in parallel with the X-axis with a pitch of $P_3'$.

More specifically, the gratings 32a–32h are so formed that the photodetectors 22a–22d respectively produce signals of the Ax, Ax', Bx and Bx' phases which have a phase difference of $\pi/2$ from one another. That is, assuming a phase of the Ax-phase phase signal is 0°, the grating 32b is formed so as to deviate from the grating 32a by a distance of $P_3/2$ to provide the Ax'-phase signal having a phase of 180°. The grating 32c is formed so as to deviate from the grating 32a by a distance of $P_3/4$ to provide the Bx-phase signal having a phase of 90°. The grating 32d is formed so as to deviate from the grating 32a by a distance of $(\frac{3}{4})P_3$ to provide the Bx'-phase signal having a phase of 270°.

In the similar manner, the gratings 32e–32h are so formed that the photodetectors 22e–22h respectively produce signals of the Ay, Ay', By and By' phases which have a phase difference of $\pi/2$ from another. That is, assuming a phase of the Ay-phase signal is 0°, the grating 32f is formed so as to deviate from the grating 32e by a distance of $P_3/2$ to provide the Ay'-phase signal having a phase of 180°. The grating 32g is formed so as to deviate from the grating 32e by a distance of $P_3/4$ to provide the By-phase signal having a phase of 90°. The grating 32h is formed so as to deviate from the grating 32e by a distance of $(\frac{3}{4})P_3$ to provide the By'-phase signal having a phase of 270°.

An Ax-phase output signal which has been subjected to differential amplitude amplification is finally obtained based on the difference between the above Ax- and Ax'-phase signals And a Bx-phase output signal which has been subjected to differential amplitude amplification is finally obtained based on the difference between the above Bx- and Bx'-phase signals. Whether the relative movement between the scales 12 and 16 (i.e., movable members 14 and 18) is directed to the plus or minus direction in the X-axis is determined from the direction of a phase deviation between the thus obtained Ax-phase output signal and Bx-phase output signal and other factors. Further, the movement distance can be determined with high resolution by electrically dividing the detection signals.

The phase discrimination and the distance determination of the relative movement between the movable members 14 and 18 in the Y-direction are performed in the similar manner.

As described above, the optical encoder of the first embodiment can detect the movement direction and movement distance in both the X-axis and Y-axis.

Figure 6:
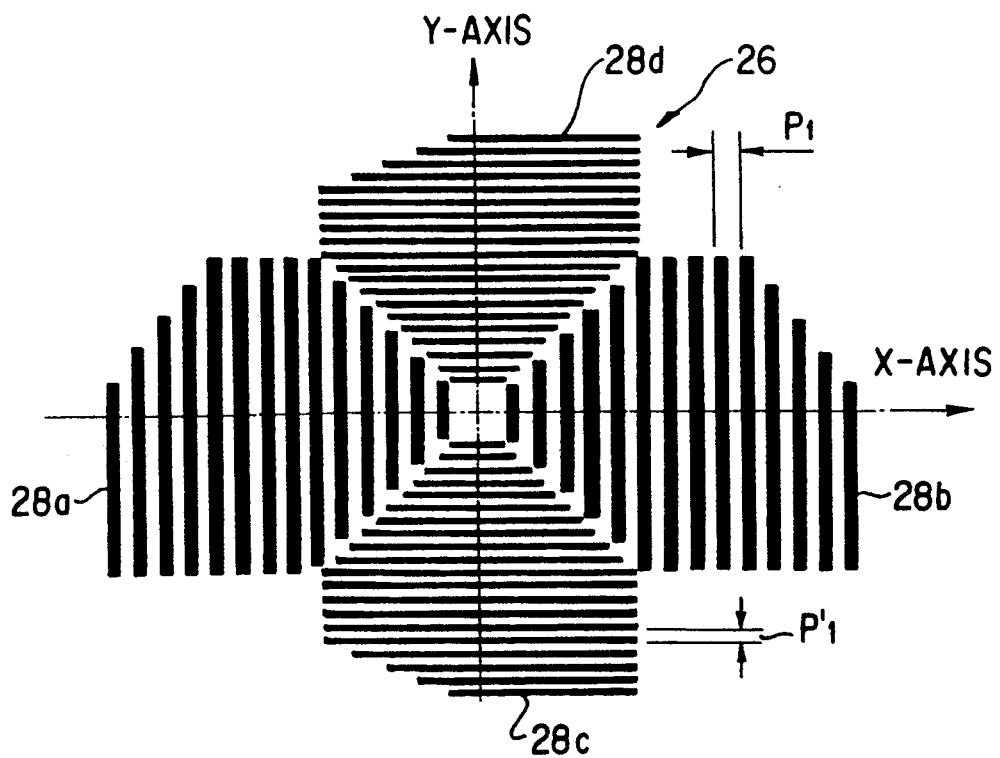
FIG. 6 is a plan view showing a specific example of the first grating in the first embodiment.

FIG. 6 shows a specific example of the first grating 26 of FIG. 3. The first grating 26 consists of the gratings 28a and 28b for movement detection in the X-direction and the gratings 28c and 28d for movement detection in the Y-direction. The gratings 28a and 28b have a relatively large pitch of $P_1$ to enable fast reading of movement in the X-direction. On the other hand, the gratings 28c and 28d have a relatively small pitch of $P_1'$ to provide high-resolution reading of movement in the Y-direction.

In the above manner, the pitches of the respective gratings may be determined in accordance with features of movement of movable members to be detected. The gratings having specific pitches can be fabricated very precisely by a conventional method.

It is preferred that the respective gratings have the following pitches:

$P_1 = 40$ μm ((light portion width Wl) = (dark portion width Wd) = 20 μm);
$P_2 = 160$ μm (Wl = 40 μm, Wd = 120 μm);
$P_3 = 80$ μm (Wl = Wd = 40 μm);
$P_1' = 20$ μm (Wl = Wd = 10 μm);
$P_2' = 80$ μm (Wl = 20 μm, Wd = 60 μm); and
$P_3' = 40$ μm (Wl = Wd = 20 μm).

If the pitch of the second grating 30 is made larger than that of the first grating 26, and the light portion width of the second grating 30 is made smaller than or equal to the pitch of the first grating 26 as exemplified above, the incoherency between the light beams formed by passage of the second grating 30 is improved to provide a higher S/N ratio of the detection signal, which contributes to easier signal processing and more accurate displacement detection.

Another preferred selection of the pitches is as follows:

$P_1 = 100$ μm ((light portion width Wl) = (dark portion width Wd) = 50 μm);
$P_2 = 400$ μm (Wl = 100 μm, Wd = 300 μm);
$P_3 = 200$ μm (Wl = Wd = 100 μm);
$P_1' = 40$ μm (Wl = Wd = 20 μm);
$P_2' = 160$ μm (Wl = 40 μm, Wd = 120 μm); and
$P_3' = 80$ μm (Wl = Wd = 40 μm).

As described above, in the optical encoder according to the first embodiment, each of the main scale and index scale has the orthogonal gratings arranged in a cruciform shape, so that the optical encoder can be provided which has a simple structure, is easy to manufacture, and is capable of detecting a relative displacement in both the X- and Y-direction.

In the following, an optical encoder according to a second embodiment is described, which has the same structure as the first embodiment, except for the first grating. Therefore, a description for the components other than the first grating is omitted here. Further, the first grating of the second embodiment is disposed in the same manner as in the first embodiment to provide a three-grating-type displacement detector which operates on the same principle.

As shown in FIG. 7, the main scale 12 has a first grating 126 which is a reflection grating including rectangular, island-like reflection portions $128_{11}$, $128_{12}$, ..., $128_{1n}$, $128_{21}$, $128_{22}$, ..., $128_{m1}$, $128_{m2}$, ..., $128_{mn}$ that are arranged in a matrix form. The rows of the reflection portions $128_{ij}$, which extend in parallel with the Y-axis and arranged in the X-direction, constitute a grating having a pitch of $P_1$, and the columns of the reflection portions $128_{ij}$, which extend in parallel with the X-axis and arranged in the Y-direction, constitute a grating having a pitch of $P_1'$.

In the optical encoder according to the second embodiment, a three-grating-type displacement detector for relative displacement in the X-direction is constructed by the gratings 34a and 34b of the second grating 30, the rows of the reflection portions $128_{ij}$ of the first grating 128, the gratings 32a-32d of the third grating 32, and the photodetectors 22a-22d. Similarly, a three-grating-type displacement detector for relative movement in the Y-direction is constructed by the gratings 34c and 34d of the second grating 30, the columns of the reflection portions $128_{ij}$ of the first grating 128, the gratings 32e-32h of the third grating 32, and the photodetectors 22e-22h.

In this embodiment, the rows of the reflections portions $128_{ij}$ are arranged with the relatively large pitch $P_1$ to enable fast reading of movement in the X-direction. On the other hand, the columns of the reflection portions $128_{ij}$ are arranged with the relative small pitch $P_1'$ to provide high-resolution reading of movement in the Y-direction. In this manner, the pitches of the respective gratings may be determined in accordance with features of movement of movable members to be detected. The gratings having specific pitches can be fabricated very precisely by a conventional method.

The two specific examples of the pitches described in connection with the first embodiment can also be employed in the second embodiment.

Another preferred selection of the pitches:

$P_1 = 20$ μm ((light portion width Wl) = (dark portion width Wd) = 10 μm);
$P_2 = 20$ μm (Wl = Wd = 10 μm);
$P_3 = 20$ μm (Wl = Wd = 10 μm);
$P_1' = 10$ μm (Wl = Wd = 5 μm);
$P_2' = 10$ μm (Wl = Wd = 5 μm); and
$P_3' = 10$ μm (Wl = Wd = 5 μm).

In this example, the pitches of the first through third gratings are made equal to one another. Further, considering that $P_1 = 20$ μm > $P_1' = 10$ μm, if an interval d (see FIG. 1) between the main scale 12 and the index scale 16 is selected so as to satisfy the relationship $d \geq P_1^2/2\lambda$ (λ: wavelength of the light emitted from the light-emitting element 20), a two-dimensional encoder can be realized whose output signal is hardly affected by a variation of the interval d.

This type of pitch selection provides the following features.

(1) When the main scale 12 is moved by a distance of $P_1$ in the X-direction, the output signal assumes such a waveform as is produced when an image on the third grating 32 is moved by a distance of $2P_1$, to provide a signal which has been optically divided into two parts. This facilitates the design of an electrical dividing circuit.

(2) Being tolerable to the variation of the interval d, this type of pitch selection is suitable for the cases of small pitches, for instance, an encoder in which $P_1$ or $P_1'$ is not more than 40 μm.

A further preferred selection of the pitches:

$P_1 = 40$ μm ((light portion width Wl) = (dark portion width Wd) = 20 μm);
$P_2 = 80$ μm (Wl = Wd = 40 μm);
$P_3 = 80$ μm (Wl = Wd = 40 μm);
$P_1' = 10$ μm (Wl = Wd = 5 μm);
$P_2' = 10$ μm (Wl = Wd = 5 μm); and
$P_3' = 10$ μm (Wl = Wd = 5 μm).

In this case, when the main scale 12 is moved by a distance of $P_1$ in the X-direction, the output signal assumes such a waveform as is produced when an image on the third grating 32 is moved by a distance of $P_1$. On the other hand, when the main scale 12 is moved by a distance of $P_1'$ in the Y-direction, the output signal assumes such a waveform as is produced when an image on the third grating is moved by a distance of $2P_1'$. Therefore, the above example is suitable for such a case that low resolution, high speed detection is required in the X-direction and high resolution, low speed detection is required in the Y-direction.

According to the second embodiment, the first grating 126 can be formed over a wide area, enabling wide-range detection. The shape of the first grating 126 can be determined as desired considering the distance of the relative movement between the main scale 12 and index scale 16.

The first grating 128 may be formed in a manner opposite to the manner of FIG. 7. That is, the island-like portions $128_{ij}$ arranged in a matrix form may be transmission portions and the remaining portion 129 may be reflective.

As described in the foregoing, in the optical encoder according to the second embodiment, the first grating is formed on the main scale by arranging the island-like portions in a matrix form, the second and third gratings are formed on the index scale by arranging these grating orthogonally to assume a cruciform shape. As a result, the two-dimensional displacement detector can be provided which has a simple structure and is capable of wide-range detection.

What is claimed is:

1. A two-dimensional optical encoder comprising a first member and a second member having a main scale and an index scale, respectively which are opposed to each other, and detecting a relative displacement between the first member and the second member in directions of an X-axis and a Y-axis, said optical encoder comprising:
   a first grating formed on the main scale and including two sub-gratings having grating lines arranged in the directions of the X- and Y-axis, respectively;
   a second grating formed on a central area of the index scale, and including a sub-grating extending along the X-axis and having grating lines arranged in the direction of the X-axis, and a sub-grating extending along the Y-axis and having grating lines arranged in the direction of the Y-axis;
   a third grating formed on the index scale, and having two sub-gratings formed outside the corresponding sub-grating of the second grating and having grating lines arranged in the direction of the X-axis with a phase difference between the two sub-gratings, and two sub-gratings formed outside the corresponding sub-grating of the second grating and having grating lines arranged in the direction of the Y-axis with a phase difference between the two sub-gratings;
   a light source fixed to the second member;
   a plurality of photodetectors fixed to the second member and arranged corresponding to the respective sub-gratings of the third grating, for receiving light emitted from the light source, transmitted through the second grating, reflected by the first grating, and transmitted through the third grating; and
   a computing circuit for producing signals indicating relative displacements in the directions of the X- and Y-axis by processing output signals of the plurality of photodetectors.

2. The optical encoder of claim 1, wherein each of the sub-gratings of the third grating includes two sub-gratings having a phase difference.

3. The optical encoder of claim 1, wherein each of the sub-gratings of the second grating is divided into two sub-gratings at a center of the index scale.

4. The optical encoder of claim 3, wherein the four sub-gratings of the second grating are divided by two straight lines intersecting each other at the center of the index scale and forming angles of 45° with the X- and Y-axis.

5. The optical encoder of claim 1, wherein the two sub-gratings of the first grating extend along the X- and Y-axis respectively to assume a cruciform shape.

6. The optical encoder of claim 5, wherein each of the two sub-gratings is divided into two sub-gratings at a center of the main scale.

7. The optical encoder of claim 6, wherein the four sub-gratings of the first grating are divided, in a central area of the main scale where they meet, by two straight lines intersecting each other at the center of the main scale and forming angles of 45° with the X- and Y-axis.

8. The optical encoder of claim 1, wherein the two sub-gratings of the first grating are constituted by rows and columns of rectangular portions arranged in a matrix form, respectively.

9. The optical encoder of claim 8, wherein the rectangular portions are portions for reflecting the light transmitted through the second grating.

10. The optical encoder of claim 1, wherein the two sub-gratings of the first grating have different pitches.

11. The optical encoder of claim 1, wherein the grating lines arranged in the direction of the X-axis of the first, second and third gratings having a same pitch, and the grating lines arranged in the direction of the Y-axis of the first, second and third gratings have a same pitch, and wherein an interval d between the main scale and the index scale is set such that $d \geq P_1^2/2\lambda$, where $P_1$ is a larger one of pitches of the two sub-gratings of the first grating and $\lambda$ is a wavelength of the light emitted from the light source.

* * * * *